United States Patent [19]

Maddox

[11] 4,156,383
[45] May 29, 1979

[54] DUAL-ROTATING MECHANISM FOR OVENS

[76] Inventor: Don C. Maddox, 1221 Lawncrest Rd. No. 313, Redding, Calif. 96001

[21] Appl. No.: 905,645

[22] Filed: May 15, 1978

[51] Int. Cl.² .......................................... A47J 37/04
[52] U.S. Cl. ................................... 99/427; 99/347; 99/443 C; 99/450; 99/448
[58] Field of Search .............. 99/347, 427, 443 C, 99/448, 443 R, 450, 386, 395, 397, 396; 198/377, 802; 126/41 C

[56] References Cited
U.S. PATENT DOCUMENTS

| | | | |
|---|---|---|---|
| 1,097,882 | 5/1914 | Saunders | 99/427 X |
| 1,971,012 | 8/1934 | MacDonald | 99/386 |
| 2,591,072 | 4/1952 | Hughes | 99/386 |
| 3,460,462 | 8/1969 | Gager | 99/443 R |
| 3,504,620 | 4/1970 | Gerhardt | 99/427 |

Primary Examiner—Billy J. Wilhite
Attorney, Agent, or Firm—Francis X. LoJacono

[57] ABSTRACT

An oven having dual-rotating mechanism whereby food-holding elements are arranged to be conveyed about the periphery of the inner housing of the oven, at which time the food-holding elements are individually rotated about their own axes, causing a dual-rotisserie action. The opposite ends of the food-holding elements are removably attached to a chain which is driven by a plurality of planetary gear assemblies driven by a motor, the food-holding elements being individually rotated by means of a stationary chain which is engaged to a sprocket attached to the food-holding elements assembly. Thus, a low-temperature cooking process can be employed therewith.

1 Claim, 6 Drawing Figures

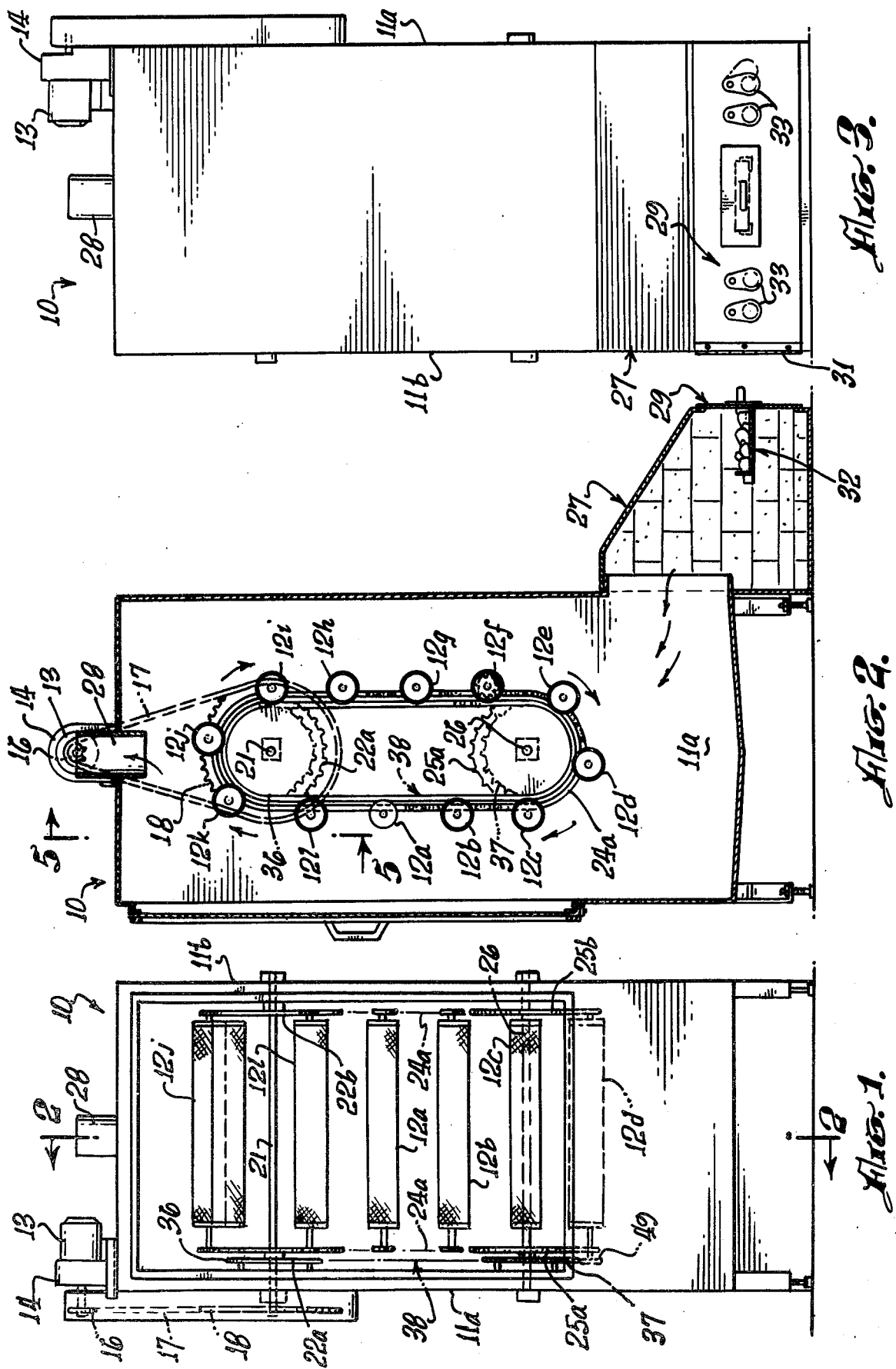

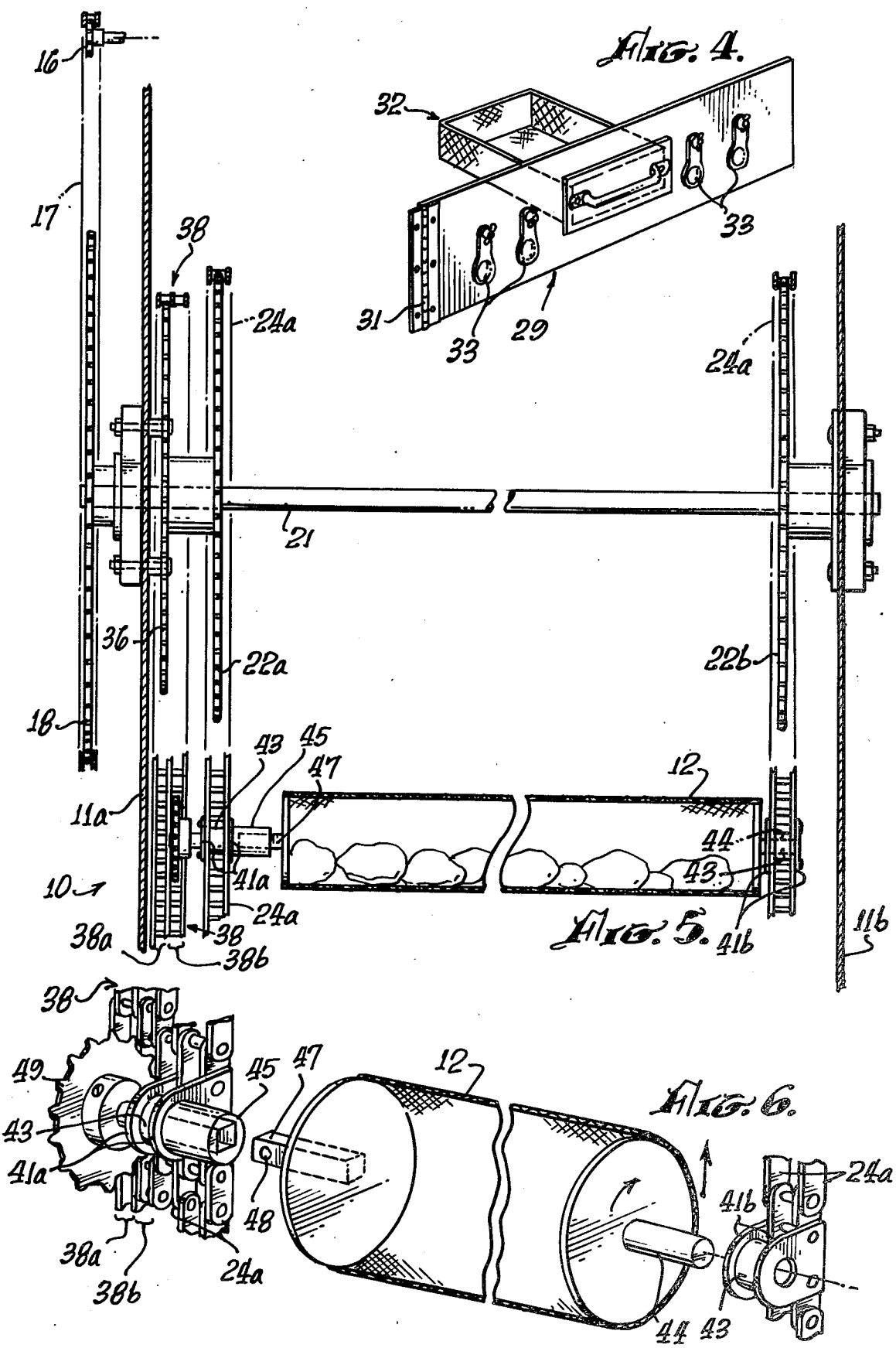

4,156,383

DUAL-ROTATING MECHANISM FOR OVENS

BACKGROUND OF THE INVENTION

1. Field of the Invention

This invention relates generally to barbecue and rotisserie-type cooking units and, more particularly, to such devices the include means to cause the food to be simultaneously revolved and rotated within an oven chamber.

2. Description of the Prior Art

As is well known in the art, various problems and difficulties are encountered in providing suitable means for barbecuing food under low temperatures—particularly the cooking of food evenly therethrough.

Many types of barbecue and rotisserie units are used; however, these devices have features that restrict their use, and often they do not provide the proper cooking temperature with an evenly distributed heat.

There is an ever-increasing demand for food prepared on a barbecue unit or in a rotisserie oven, the cooking thereof being to turn the food so that all sides thereof are evenly cooked. Unfortunately, most present-day devices do not obtain optimal cooking results.

SUMMARY OF THE INVENTION

Broadly speaking the present invention relates to a rotisserie-type oven wherein a plurality of removable food-holding elements undergo a dual-turing action. A dynamic mechanism—comprising a pair of movable endless chains—drives the food-holding elements to revolve in a closed loop, or orbit—with the longitudinal axes of the food-holding elements continuously parallel to the axis of the orbit. Simultaneously a passive mechanism—comprising a fixedly-positioned endless chain—causes the food-holding elements to continuously rotate around their own individual axes.

OBJECTS AND ADVANTAGES OF THE INVENTION

It is, therefore, the principal objective of the present invention to provide an improved oven of the barbecue or rotisserie type.

It is another objective of the present invention to provide an improved oven that assures more even cooking.

It is still another objective of the present invention to provide an improved oven that achieves improved self-basting.

It is a further objective of the present invention to provide an improved oven that causes the food to be simultaneously revolved and rotated.

It is a still further objective of the present invention to provide an improved oven that achieves the above results in a simple manner.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

The attainment of these objectives and others will be realized from a study of the following description, taken in conjunction with the drawings, of which:

FIG. 1 shows a front diagrammatic view of the oven.

FIG. 2 shows an internal cross-sectional view of the oven.

FIG. 3 shows a rear view of the oven.

FIG. 4 shows a pictorial view of the firebox.

FIG. 5 shows a partial diagrammatic view of the oven-operating apparatus.

FIG. 6 shows an enlarged, exploded pictorial view of a portion of the operating apparatus.

DESCRIPTION OF THE PREFERRED EMBODIMENT

FIG. 1 shows a diagrammatic view of an oven 10 comprising an upright enclosure having a suitable front door (omitted for clarity) and side walls 11a and 11b. Oven 10 has the advantage that it requires minimal floor space—which is usually at a premium in a commercial establishment; and has the advantage that it extends upwardly—where space is usually available.

The Revolving Mechanism (I)

Oven 10 is shown to contain a plurality of food-holding elements 12—which may be skewers, baskets, or any other configuration that may be desirable for holding the particular type and amount of food that is to be cooked.

Referring additionally to FIG. 2, it may be seen that the plurality of food-holding baskets 12a, 12b, 12c, etc. revolve continuously in a closed, substantially oblong orbit, as indicated by the arrows. The revolution of the food baskets is readily achieved, FIG. 2 illustrating the use of a small electric motor 13 (about half a horsepower) that acts through a suitable gearbox 14.

The following presentation illustrates the use of power-transmission chains and complementary sprocket wheels such as are typically used on bicycles, motorcycles, and other machinery. These chain-and-sprocket systems have many advantages: they are available in desired strengths; they are easily adjusted to required lengths; they are long-lived and reliable; they need minimal maintenance; and they are available in many materials (such as stainless steel) that readily withstand the oven environment. For ease of disclosure, the shortened terms "chain" and "sprocket" will be used.

The output shaft of gearbox 14 is affixed to a motor sprocket 16, a motor chain 17, and a motor idler sprocket 18—this latter rotating a drive shaft 21, a primary drive sprocket and a secondary drive sprocket 22a and 22b, a pair of engaged endless-drive chains 24a and 24b, a primary and a secondary idler-drive sprocket 25a and 25b and an idler-drive shaft 26. The combination of the drive sprockets, the endless-drive chains, and the idler-drive sprockets coact to provide a reliable, substantially-oval orbit for the baskets, the composite drive mechanism being a dynamic one. The details of the drive mechanism will be discussed later.

The Firebox

FIG. 2 also shows oven 10 to have firebox 27—for charcoal or the like—which may be lined with refractory brick, if so desired. A chimney 28 encourages the free flow, circulation, and exit of heating and cooking gases.

FIG. 3 shows a rear view of oven 10, the closure-panel 29 of the firebox being hinged at 31 for permitting access to the interior of the firebox. Panel 29 comprises a removable fire drawer 32 and air-flow control structures 33, as shown in FIG. 4.

The Revolving Mechanism (II)

The partial enlarged view of FIG. 5 shows details of the previously described drive mechanism; i.e., the motor sprocket 16, the motor chain 17, the motor idler sprocket 18, the drive shaft 21, the primary and secondary drive sprockets 22a and 22b, and the drive chains 24a and 24b. This dynamic drive mechanism causes the orbital revolutions of baskets 12, in a manner that will be understood from the following explanation.

The actual means for mounting the basket 12 onto the drive chains 24a and 24b may take any of a number of designs, depending upon the desired result. For example, it may be designed so that gravity maintains the basket at a constant orientation; but this design causes the food in the lower portion of the basket to be repeatedly exposed to the intense heat from the firebox. As a result of this design, the food in the upper portion of the basket is never exposed to the intense heat. Thus this design produces overcooked and undercooked food. Also, food at the top of the basket is not suitably heated to release all its juices; and the juices tend to drip off the food so that the resultant self-basting is not completely satisfactory.

The present invention overcomes this defect, and assures maximal self-basting and uniform cooking.

FIG. 5 (and FIGS. 1 and 2) show an arrangement for causing the baskets 12 to rotate around their individual axes as they revolve around their oval orbits. The basket rotation is achieved as follows:

As indicated in FIGS. 1 and 5, a first sprocket 36 is mounted concentrically with drive shaft 21 being fixedly mounted in a manner that prevents it from moving or rotating. A second sprocket 37 (not visible in FIG. 5) is similarly fixedly mounted concentrically with idler shaft 26. An endless chain 38 is engaged with the first and second fixed sprockets 36 and 37; so that the chain 38 forms an immovable loop. Thus, the rotation-causing mechanism is passive, rather than dynamic.

For reasons that will be explained later, chain 38 is actually a "multi-strand" chain comprising a pair of chains 38a and 38b.

Referring now to the enlarged exploded view of FIG. 6, this shows the basket 12, and the primary and secondary drive chains 24a and 24b—which are indicated, by the straight arrows, to be moving along the upward portion of their orbits. Brackets 41a and 41b are affixed to drive chains 24a and 24b, respectively. The right-hand bracket 41b is shown to comprise a bushing or bearing 43 that accepts the round end shaft 44 of the basket 12; whereas the left-hand bracket 41a is shown to comprise a rotatable member 45 having a square socket that accommodates the square tang 47 of basket 12. A friction-fit element 48 may be used to prevent inadvertent disengagement of the basket.

Thus, the baskets 12 are removably mounted to drive chains 24a and 24b.

It will be noted that the left-hand rotation member 45 has a "walking" sprocket 49 affixed to its other end, the teeth of walking sprocket 49 being engaged with the spaces of the second chain pair 38b of the composite chain 38. Thus, as the basket revolves around its orbit, the walking sprocket 49 associated with the basket "walks" along the walkway formed by the fixed chain 38. In this way, basket 12 rotates around its own longitudinal axis—as indicated by the curves arrows—while it revolves around its orbit.

ADVANTAGES

The disclosed invention has many advantages over prior art devices.

It is particularly adapted for commercial usage.

It requires minimal floor space.

Its food-holding elements may be added and removed as needed.

It has a large capacity, considering its minimal floor space requirements.

It cooks all the food uniformly.

It produces an improved food flavor, because of the improved self-basting.

Its lower temperature permits slower cooking resulting in less shrinkage.

Its heat may be produced by use of a renewable fuel, charcoal.

It is long-lived, and requires minimumal maintenance.

It eliminates the need for absolutely-uniform heat distribution.

It maximizes the effect of pre-seasoning.

It tenderizes the food.

It is quite simple.

The invention and its attendant advantage will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A rotisserie-type oven comprising:
a plurality of food-holding baskets;
means for causing said food baskets to revolve in a closed substantially-oval orbit, with the individual axes of said baskets continuously parallel with the axis of said orbit;
means for causing each said basket to simultaneously rotate around its own individual longitudinal axis;
said revolution-causing means comprising primary and secondary drive sprockets, a drive shaft interconnecting said drive sprockets, primary and secondary idler drive sprockets, and idler drive shaft interconnecting said idler drive sprockets, and primary and secondary drive chains engaged with respective said primary and secondary drive sprockets and with respective said primary and secondary idler drive sprockets;
said drive members forming a dynamic revolution-causing mechanism;
said rotating-causing means comprising first and second spaced-apart fixed sprockets, a first chain engaged with said spaced-apart fixed sprockets, a second chain—paired with said first chain—adapted to serve as a walkway;
said rotating-causing members forming a passive rotating-causing mechanism;
individual walking sprockets associated with respective said baskets;
means interlinking said walking sprockets with said passive walkway formed by said second chain, for causing said baskets to rotate as their associated walking sprockets walk along said walkway.

* * * * *